United States Patent
Yamada

(10) Patent No.: US 7,544,378 B2
(45) Date of Patent: Jun. 9, 2009

(54) PREPARATION PROCESS OF TEA EXTRACT

(75) Inventor: Yasushi Yamada, Tokyo (JP)

(73) Assignee: Kao Corporation, Tokyo (JP)

( * ) Notice: Subject to any disclaimer, the term of this patent is extended or adjusted under 35 U.S.C. 154(b) by 587 days.

(21) Appl. No.: 10/937,444

(22) Filed: Sep. 10, 2004

(65) Prior Publication Data

US 2005/0084574 A1    Apr. 21, 2005

(30) Foreign Application Priority Data

| Sep. 12, 2003 | (JP) | ............................. 2003-320974 |
| Dec. 12, 2003 | (JP) | ............................. 2003-414872 |
| Dec. 12, 2003 | (JP) | ............................. 2003-414873 |

(51) Int. Cl.
   *A23F 3/00*    (2006.01)
(52) U.S. Cl. .......................... 426/435; 426/597
(58) Field of Classification Search ................. 426/597, 426/435

See application file for complete search history.

(56) References Cited

U.S. PATENT DOCUMENTS

| 2,963,368 | A |    | 12/1960 | Greenbaum |
| 3,492,126 | A |    | 1/1970  | Rubenstein |
| 4,051,267 | A |    | 9/1977  | Jongeling |
| 5,107,000 | A | *  | 4/1992  | Lunder ........................ 549/399 |
| 6,387,428 | B1 | * | 5/2002  | Kinugasa et al. ............ 426/435 |
| 2005/0084574 | A1 |    | 4/2005  | Yamada |
| 2005/0158437 | A1 |    | 7/2005  | Itaya et al. |

FOREIGN PATENT DOCUMENTS

| EP | 1 297 757 A1 |   | 4/2003 |
| GB | 794 566      |   | 5/1958 |
| JP | 59-119182    |   | 8/1984 |
| JP | 63-308001    | * | 12/1988 |
| JP | 6-178651     |   | 6/1994 |
| JP | 11-113491    |   | 4/1999 |
| JP | 2000-50799   |   | 2/2000 |
| JP | 2001204386   | * | 7/2001 |
| JP | 2003-219799  |   | 8/2003 |
| JP | 2003-225053  |   | 8/2003 |
| WO | WO 94/14329  |   | 7/1994 |
| WO | WO 02/39822 A2 |   | 5/2002 |

OTHER PUBLICATIONS

Astill et al. Factors Affecting the Caffeine and Polyphenol Contents of Black and Green Tea Infusions. J. Agric. Food Chem. 2001. vol. 49. pp. 5340-5347.*

(Continued)

*Primary Examiner*—Anthony Weier
(74) *Attorney, Agent, or Firm*—Oblon, Spivak, McClelland, Maier & Neustadt, P.C.

(57) ABSTRACT

The present invention relates to a preparation process of a tea extract containing non-polymer catechins extracted from tea leaves at a high extraction percentage, having a caffeine/non-polymer catechins ratio almost equal to the natural composition of the tea leaves and having good flavor and taste with less coarse taste, which includes charging the tea leaves in a column type extractor and continuously feeding the extractor with cold or hot water. The invention also relates to a packaged tea beverage containing the tea extract.

17 Claims, 1 Drawing Sheet

OTHER PUBLICATIONS

"Report from tea experimental station", Ministry of Agriculture and Forestry Tea Experimental Station, vol. 3, Oct. 28, 1965, pp. 25-48, 83-86.

Tei Yamanishi, "The Science of Tea", published by Shokabo, First edition, Jun. 10, 1992, pp. 173-177, 224-225.

Yasumoto Fuchinoue, et al., "Treatise on Japanese tea", Rural Culture Association, First edition, Apr. 10, 1999, pp. 162-165.

Toshiro Nakamura et al., "Chemistry and function of green tea, black tea and oolong tea", published by Kogaku Shuppan, Oct. 30, 1991, pp. 20-29.

Chigusa Kobayashi, et al., "Analysis of Catechins, Methylxanthines and L-Ascorbic Acid in Tea Leaves and Tea Drinks", Ann. Rep. Tokyo Metr. Res. Lab. P.H., 49, 1998, pp. 135-143.

U.S. Appl. No. 12/183,675, filed Jul. 31, 2008, Iwasaki, et al.

U.S. Appl. No. 12/183,707, filed Jul. 31, 2008, Iwasaki, et al.

Patent Abstracts of Japan, JP 11-103777, Apr. 20, 1999.

* cited by examiner

PREPARATION PROCESS OF TEA EXTRACT

FIELD OF THE INVENTION

The present invention relates to a preparation process of a tea extract having good flavor and taste and a packaged tea beverage using the tea extract thus prepared.

BACKGROUND OF THE INVENTION

A tea extract to be used for the preparation of a packaged tea beverage is conventionally obtained by charging tea leaves and hot water for extraction in an opened extraction tank which is generally called kneader, stirring the mixture and then taking out the extract from the tank. Of the ingredients contained in the tea leaves, non-polymer catechins cannot be extracted so easily as caffeine when the tea leaves are extracted with hot water. According to the conventional method, therefore, a caffeine/non-polymer catechins ratio in the extract inevitably becomes higher than that in the tea leaves, in other words, higher than the natural composition. A caffeine/non-polymer catechins ratio in the extract can be reduced close to that in the tea leaves by extracting under severer conditions such as longer stirring time or higher extraction temperature and thereby increasing an extraction percentage of the non-polymer catechins, but this method has a disadvantage of impairing the flavor and taste of the resulting tea extract.

In order to obtain a tea extract having good flavor and taste, there have been reported a method (Japanese Patent Application Laid-Open No. 2000-50799) of depositing tea leaves in a tea extracting tank equipped with a metal mesh, taking out a tea extract from below the tea leaves while feeding, from above the tea leaves, water of from 0 to 36° C. from which dissolved oxygen has been removed, and removing the precipitate by cooling the extract to from −1 to 6° C.; and a method (Japanese Patent Application Laid-Open No. Hei 6-178651) of adding, to tea leaves, 2 to 3 times the weight, based on the weight of the tea leaves, of water to wet them for several minutes, pouring 2 to 5 times the weight, based on the weight of the tea leaves, of hot water of from 80 to 95° C. to the wetted tea leaves to cause elution of a drinkable ingredient therefrom, and obtaining an eluate having a concentration of from 5 to 10 Brix % as a concentrated tea beverage.

In the method as described in Japanese Patent Application Laid-Open No. 2000-50799, however, an extraction percentage of non-polymer catechins from the tea leaves is low owing to the extraction at low temperature. Production of a packaged tea beverage by using this method is therefore not economically efficient. The method as described in Japanese Patent Application Laid-Open No. Hei 6-178651 uses only a small amount of an extracting liquid in order to prepare a concentrated extract so that an extraction percentage of non-polymer catechins contained in the tea leaves is low and production of a packaged tea beverage by using this method is also economically inefficient. Moreover, a caffeine/non-polymer catechins ratio in the extract becomes higher than that of the tea leaves, that is, natural composition.

A conventional preparation process of a tea extract by using a kneader, that is, an opened extraction tank is on the other hand accompanied with the drawbacks that vapor dissipation from the extraction tank during extraction work deteriorates the working environment and it also deteriorates the quality of the tea extract owing to the dissipation of a flavor ingredient in the tea and oxidation of the tea.

As means for overcoming the above-described problems, there have been reported a process (Japanese Patent Application Laid-Open No. Hei 7-23714) of using a closed extraction tank and obtaining stirring effects by blowing an inert gas from below the extraction tank, and a process (Japanese Patent Laid-Open No. 11-103777) of feeding tea leaves and extracting water in a closed extraction tank, extracting the tea leaves in the extraction tank and taking out the extract from the extraction tank, wherein the extract once taken out from the extraction tank is refluxed in the extraction tank again and then taken out.

These processes need a temperature increase or prolongation of time upon extraction to raise the extraction efficiency, which however deteriorates the flavor and taste of the tea extract thus obtained. In addition, fine powder and coarse taste of ingredients inevitably get mixed in the tea extract owing to the floating of the tea leaves in the extraction tank, which deteriorates the flavor and taste.

SUMMARY OF THE INVENTION

In a first aspect of the present invention, there are thus provided a process for preparing a tea extract, which contains charging tea leaves in a column-type extractor, discharging the extract from the extractor while continuously feeding thereto hot water of from 45 to 95° C. and adjusting an extraction percentage of non-polymer catechins from the tea leaves to from 75 to 100%; and a packaged tea beverage obtained by using the thus-prepared tea extract either as is or after dilution.

In a second aspect of the present invention, there are also provided a process for preparing a tea extract having the following components (A) and (B):

(A) from 0.05 to 0.7 wt. % of non-polymer catechins
(B) water insoluble solids having a particle size of from 0.2 to 0.8 μm at a content ratio of Component (B) to Component (A) [(B)/(A)] not greater than 0.09, which contains charging tea leaves in a column-type extractor and extracting the tea leaves by discharging the extract from the extractor while continuously feeding thereto cold or hot water; and a packaged tea beverage obtained by using the thus-prepared tea extract either as is or after dilution.

In a third aspect of the present invention, there are also provided a process for preparing a tea extract having a concentration of non-polymer catechins of from 0.05 to 0.7 wt. %, which contains charging tea leaves in a closed column extractor at a (volume in the column)/(volume of tea leaves just after charging) ratio ranging from 1.0 to 7.0, feeding cold or hot water upward from the lower part of the column, and adjusting an extraction percentage of the non-polymer catechins to 40 to 100%; and a packaged tea beverage obtained by using the thus-prepared tea extract either as is or after dilution.

DETAILED DESCRIPTION OF THE INVENTION

Figure 1:
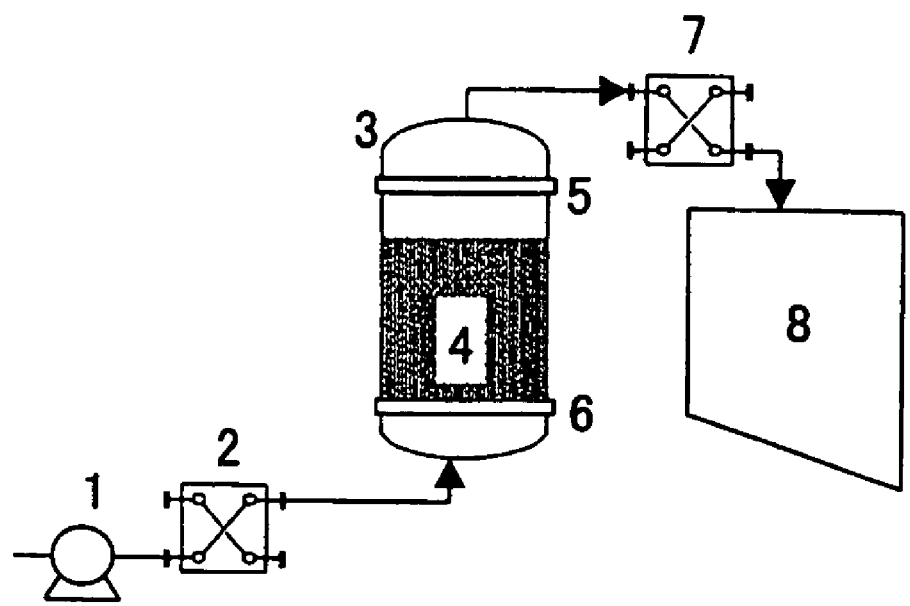
FIG. 1 is a schematic view illustrating the extraction method using a closed column extractor according to the invention, in which indicated at numeral 1 is a pump, 2 a heat exchanger for heating deionized water, 3 a closed extraction column, 4 tea leaves, 5 a (upper) retainer plate of tea leaves, 6 a (lower) retainer plate of tea leaves, 7 heat exchanger for cooling an extract, and 8 an extract recovery tank.

The present invention provides a preparation process of a tea extract containing non-polymer catechins extracted from tea leaves at a high extraction percentage, having a caffeine/non-polymer catechins ratio almost equal to the natural composition of the tea leaves, and having good flavor and taste with less coarse taste.

The present inventors have found that by adopting, for tea extraction, a process of charging tea leaves in a column-type extractor and discharging an extract from the extractor while continuously feeding thereto hot water of from 45 to 90° C., and adjusting an extraction percentage of non-polymer catechins from the tea leaves to 75 to 100%, an extract having a caffeine/non-polymer catechins ratio as low as the natural composition of the tea leaves is available; and that the tea extract thus obtained has good flavor and taste so that a packaged tea beverage containing non-polymer catechins at a high concentration can be obtained by using the resulting extract either as is or after dilution.

The present inventors have also found that by adopting a tea extraction process of charging tea leaves in a column-type extractor and discharging an extract from the extractor while continuously feeding thereto cold or hot water and adjusting a content ratio of (B) water insoluble solids having a particle size of from 0.2 to 0.8 μm to (A) non-polymer catechins [(B)/(A)] to not greater than 0.09, an extract having good flavor and taste with less coarse taste is available; and that a packaged tea beverage containing non-polymer catechins at a high concentration can be obtained by using the resulting tea extract either as is or after dilution.

The present inventors have further found that a tea extract having good flavor and taste can be obtained in a short time by charging tea leaves in an amount limited to a certain range to a closed column extractor, feeding water or hot water for extraction upward from the lower part of the column, and controlling the extraction so as to perform it at a high extraction efficiency of non-polymer catechins and thereby yield a tea extract having the concentration of non-polymer catechins within a predetermined range, that is, as high as from 0.05 to 0.7 wt. %; and that the tea extract thus obtained has good flavor and taste so that a packaged tea beverage containing a high concentration of non-polymer catechins can be obtained by using the resulting extract either as is or after dilution.

The term "non-polymer catechins" as used herein is a generic term, which collectively encompasses non-epicatechins such as catechin, gallocatechin, catechin gallate and gallocatechin gallate, and epicatechins such as epicatechin, epigallocatechin, epicatechin gallate, epigallocatechin gallate.

Examples of the tea leaves for use in the present invention include those from green teas such as sencha (middle-grade green tea), gyokuro (shaded green tea), tencha (powdered tea) and the like, which have been prepared from tea leaves of the Genus *Camellia*, for example, *C. sinensis, C. assaimica* and the Yabukita variety or their hybrids; semi-fermented teas such as Tie Kuan Yin, Se Chon, Huang Jin Gui, and Wu yi yan cha which are collectively called "Oolong tea"; and fully fermented teas, for example, black teas such as Darjeeling, Assam and Sri Lanka. Of these, green tea leaves are preferred.

In the preparation process of a tea extract according to the invention, a column type extractor, for example, a closed extraction column as illustrated in FIG. 1 is employed. Tea leaves 4 are charged in the extraction column 3. A sufficient amount of flavor ingredients can be collected by using this closed column.

First, a preparation process of a tea extract according to the first aspect of the invention will be described.

In this invention, a method of feeding a column with extracting water from one end to the other end of the column through one path is preferable to a method of circulating a predetermined amount of water charged in a tank, because in the former one, a thermal history which the extract receives is smaller and therefore quality deterioration due to heat is less. The extracting water may be fed by either an upward or downward flow.

Water used for extraction has a temperature of from 45 to 95° C., preferably from 50 to 85° C., more preferably from 60 to 80° C. When the temperature is lower than 45° C., a large amount of water becomes necessary in order to heighten the extraction efficiency of non-polymer catechins, which prolongs extraction time and deteriorates working efficiency and economical efficiency.

A quotient obtained by dividing a flow rate of water fed to the column by a cross-section of the column, that is, a linear speed of water in the column is from 1.0 to 20.0 cm/min, preferably from 2.0 to 15.0 cm/min, more preferably from 3.0 to 10.0 cm/min. When the linear speed is too high, tea leaves are consolidated and spaces therebetween are occluded. When the linear speed is too low, it takes long time to complete extraction, leading to lowering in working efficiency.

A quotient obtained by dividing the height of the tea leaves layer swollen during extraction by the above-described linear speed, that is, an average retention time of the tea leaves layer in water is from 0.5 to 15.0 min, preferably from 0.7 to 10.0 min, more preferably from 0.9 to 8.0 min. When the average retention time is too short, the non-polymer catechins cannot be extracted desirably, while too long average retention time increases the time spent for extraction, leading to lowering in working efficiency.

The height of the tea leaves charged in the column before beginning of the extraction is from 30 to 500 mm, preferably from 40 to 300 mm, more preferably for 50 to 200 mm. When the height is too high, a pressure loss of the tea leaves layer increases and a flow rate lowers. When the height is too low, a batch size per single extraction decreases, leading to lowering in working efficiency, because extraction should be carried out multiple times.

When an extract/(charged tea leaves) weight ratio, that is, the (extract discharged from the column)/(tea leaves charged in the column) weight ratio is too low, the concentration of non-polymer catechins in the tea extract heightens, but the extraction percentage of non-polymer catechins from the tea leaves does not become high. When the ratio is too high, the extraction percentage of non-polymer catechins increases, but the concentration of non-polymer catechins in the tea extract lowers. From the standpoint of heightening the extraction percentage from the tea leaves, and thereby improving economical efficiency and preparing a beverage containing a high concentration of catechins, the extract/(charged tea leaves) weight ratio is from 10 to 100, more preferably from 15 to 80, even more preferably from 20 to 60.

To calculate the extraction percentage (%) of non-polymer catechins in the present invention, it is necessary to find the total amount of the non-polymer catechins contained in the tea leaves. It has been confirmed that by charging tea leaves in a column and feeding thereto deionized water of 85° C., the concentrations of the non-polymer catechins and caffeine at the outlet of the column, which were both high initially, gradually lowered and even to zero when the extract/(charged tea leaves) weight ratio was 70, meaning that the non-polymer catechins and caffeine liquated out completely from the tea leaves. The concentration of non-polymer catechins in the extract yielded in the tank at this time is designated as X (wt. %). In this case, the extraction percentage (%) of the non-polymer catechins in various conditions can be found in accordance with the following equation: (Y×(extract/charged tea leaves weight ratio)/(X×70))×100 wherein, Y represents the concentration (wt. %) of non-polymer catechins in an extract under each condition. The denominator of this equation corresponds to the total amount of the non-polymer catechins contained in the unit amount of tea leaves. In the invention, extraction is performed so that the extraction percentage of the non-polymer catechins fall within a range of from 75 to 100%. At an extraction percentage less than 75 wt. %, a caffeine/non-polymer catechins ratio in the extract becomes higher than the natural composition of the tea leaves. It is recommended to measure the total amount of non-polymer catechins contained in tea leaves by a preliminary extraction test, because it varies depending on the kind of raw material tea leaves, tea-growing district or production year.

As described above, the concentration ratio of caffeine/non-polymer catechins in the extract recovered in the tank when deionized water of 85° C. is fed to the column is judged equal to the caffeine/non-polymer catechins ratio (weight ratio) in the raw material tea leaves. In the invention, extraction is performed so that the caffeine/non-polymer catechins ratio in the extract would be 100 to 110% of that of the raw material tea leaves. In the conventional method, the caffeine/non-polymer catechins ratio exceeds 110% and becomes higher than the natural composition of the raw material tea leaves, because the non-polymer catechins are not so easily extracted as caffeine. The caffeine/non-polymer catechins ratio (weight ratio) in the tea extract thus obtained is preferably from 100 to 110%, more preferably from 100 to 108%, even more preferably fro 100 to 105% of that contained in the raw material tea leaves.

Although the extraction time in the process of the invention is determined by the extraction percentage of the non-polymer catechins, it is preferably from 2 to 60 minutes, more preferably from 3 to 48 minutes, even more preferably from 4 to 28 minutes in one-path extraction.

The tea extract thus obtained can be used for the preparation of a packaged tea beverage either as is or after dilution, because it contains non-polymer catechins extracted from tea leaves at a high extraction percentage, has a caffeine/non-polymer catechins ratio almost equal to the natural composition of the raw material tea leaves, and has good flavor and taste without coarse taste. When a packaged tea beverage is prepared using the tea extract thus obtained, the concentration of non-polymer catechins is adjusted to from 0.05 to 0.5 wt. %, preferably from 0.06 to 0.5 wt. %, more preferably from 0.07 to 0.5 wt. %, still more preferably from 0.08 to 0.4 wt. %, still more preferably from 0.09 to 0.4 wt. %, still preferably from 0.10 to 0.3 wt. %, even more preferably from 0.12 to 0.3 wt. %, at which the non-polymer catechins bring about accumulated fat burning promoting effects, dietary fat burning promoting effects and hepatic β-oxidation gene expression promoting effects (Japanese Patent Application Laid-Open No. 2002-326932).

In the packaged tea beverage according to the invention, the proportion of the gallates consisting of catechin gallate, epicatechin gallate, gallocatechin gallate and epigallocatechin gallate in the entire non-polymer catechins is preferably from 35 to 100 wt. %, more preferably from 35 to 98 wt. %, even more preferably from 35 to 95 wt. % from the standpoint of the effectiveness of the physiological effects of the non-polymer catechins.

Next, the preparation process of a tea extract according to the second aspect of the invention will next be described.

In this invention, extracting water may be fed from the one end of the column to the other end through one path or alternatively, a predetermined amount of water filled in a tank may be circulated. The former one-path method is preferred, because the thermal history applied to the extract is small and quality deterioration caused by heat is less. The extracting water may be fed as an upward flow or downward flow.

Water to be used for extraction may be either cold or hot. For example, its temperature is preferably from 0 to 95° C., more preferably 35 to 95° C., even more preferably from 55 to 85° C.

A quotient obtained by dividing a flow rate of water fed to the column by a cross-section of the column, that is, a linear speed of water in the column is from 1.0 to 20.0 cm/min, preferably from 2.0 to 15.0 cm/min, even more preferably from 3.0 to 10.0 cm/min. When the linear speed is too high, tea leaves are consolidated and spaces therebetween are occluded. When the linear speed is too low, on the other hand, it takes long time to complete extraction, leading to lowering in working efficiency.

A quotient obtained by dividing a height of a tea leaf layer swollen during extraction by the above-described linear speed, that is, an average retention time of the tea leaf layer in water is from 0.5 to 15.0 min, preferably from 0.7 to 10.0 min, even more preferably from 0.9 to 8.0 min. When the average retention time is too short, the non-polymer catechins cannot be extracted desirably, while too long average retention time increases the time spent for extraction, leading to lowering in working efficiency.

The height of the tea leaves charged in the column before beginning of the extraction is from 30 to 500 mm, preferably from 40 to 300 mm, even more preferably from 50 to 200 mm. When the height is too high, a pressure loss of the tea leaf layer increases and a flow rate lowers. When the height is too low, a batch size per single extraction decreases, leading to lowering in working efficiency, because extraction should be carried out multiple times.

In the invention, extraction is performed so that the concentration of non-polymer catechins (A) would be 0.05 to 0.7 wt. % in the extract. At concentrations less than 0.05 wt. %, the above-described packaged tea beverage having a high concentration of catechins cannot be produced. For obtaining an extract having a concentration of non-polymer catechins exceeding 0.7 wt. %, only a very small amount of cold or hot water should be used for extraction. This results in a low extraction percentage of the non-polymer catechins from the tea leaves and inferior economical efficiency. The term "extract" as used herein means a liquid obtained by removing tea leaves by a tea-leaf separating plate such as metal mesh and cooling the residue to room temperature; or after this cooling, removing fine powder of tea leaves by a centrifugal separator or nylon mesh.

The tea extract contains water insoluble solids having a particle size of from 0.2 to 0.8 μm (B). These solids are presumed to appear as a result of coagulation or bonding of polymer substances including polysaccharides, proteins and saponin. When their content is large, the extract has bad flavor and taste with strong coarse taste. When a content ratio of the water insoluble solids having a particle size of from 0.2 to 0.8 μm (B) to the non-polymer catechins (A) [(B)/(A)] is not greater than 0.09, the tea extract has pure flavor and taste with less coarse taste.

When the extract/(charged tea leaves) weight ratio, that is, the (extract discharged from the column)/(tea leaves charged in the column) weight ratio is too low, the concentration of non-polymer catechins in the tea extract heightens, but the extraction percentage of the non-polymer catechins from the tea leaves and economical efficiency are low. When the ratio is too high, on the other hand, the extraction percentage of the non-polymer catechins increases, but the concentration of non-polymer catechins in the tea extract lowers. From the standpoints of heightening the extraction percentage from the tea leaves and thereby improving economical efficiency, and preparing a beverage containing a high concentration of catechins, the extract/(charged tea leaves) weight ratio is from 10 to 100, more preferably from 12 to 80, even more preferably from 15 to 60.

Although the extraction time in the process of the invention is determined by the extraction percentage of the non-polymer catechins, it is preferably from 2 to 60 minutes, more preferably from 3 to 48 minutes, even more preferably from 4 to 28 minutes in one-path extraction.

The tea extract thus obtained can be used for the preparation of a packaged tea beverage either as is or after dilution, because it contains a high concentration of non-polymer catechins and has good flavor and taste without coarse taste. When a packaged tea beverage is prepared using the tea extract thus obtained, the concentration of non-polymer catechins is adjusted to from 0.05 to 0.5 wt. %, preferably from 0.06 to 0.5 wt. %, more preferably from 0.07 to 0.5 wt. %, still more preferably from 0.08 to 0.4 wt. %, still more preferably from 0.09 to 0.4 wt. %, still more preferably from 0.10 to 0.3 wt. %, even more preferably from 0.12 to 0.3 wt. %, at which the non-polymer catechins bring about accumulated fat burning promoting effects, dietary fat burning promoting effects and hepatic β-oxidation gene expression promoting effects (Japanese Patent Application Laid-Open No. 2002-326932).

In the packaged tea beverage according to the invention, the proportion of the gallates consisting of catechin gallate, epicatechin gallate, gallocatechin gallate and epigallocatechin gallate in the entire non-polymer catechins is preferably from 35 to 100 wt. %, more preferably from 35 to 98 wt. %, even more preferably from 35 to 95 wt. % from the standpoint of the effectiveness of the physiological effects of the non-polymer catechins.

Next, the preparation process of a tea extract according to the third aspect of the invention will next be described.

With regards to the amount of the tea leaves charged in the column, a (volume in the column)/(volume of tea leaves just after charging) ratio is preferably adjusted to from 1.0 to 7.0, more preferably from 1.0 to 3.6, even more preferably from 1.0 to 2.6 from the viewpoint of the extraction efficiency of non-polymer catechins. The term "volume in the column" as used herein means a volume between tea leaf retainer plates 5 and 6 in FIG. 1. When the ratio exceeds 7, floatation of the tea leaves occurs, leading to appearance of fine powder and coarse-taste of ingredient. Extraction without causing the floating of the tea leaves is therefore preferred. The lower the ratio, the higher the extraction efficiency of the non-polymer catechins.

Extracting water may be either cold water or hot water. For example, the water is preferably from 0 to 95° C., more preferably from 35 to 95° C., even more preferably from 55 to 95° C. An organic acid or salt thereof such as sodium ascorbate may be added to cold or hot water used for extraction.

In the invention, extracting water is fed upward from the lower part of the column. When water is fed upward from the lower part of the column, the direction of gravity applied on the tea leaves is opposite to the direction of the water flow so that the tea leaves are neither consolidated nor occluded. This enables the high-flow-rate and short-time treatment and improves the flavor and taste and productivity of the tea extract. A predetermined amount of hot deionized water filled in a tank may be fed by circulation, but the one-path extraction which imposes less thermal history on the extract is preferred.

When, in the column one-path method, the extract/(charged tea leaves) weight ratio, that is, the (extract discharged from the column)/(tea leaves charged in the column) weight ratio is too large, the extraction percentage of non-polymer catechins increases, but the concentration of non-polymer catechins in the tea extract lowers. When the ratio is too low, the concentration of non-polymer catechins in the tea extract increases, but the extraction percentage of the non-polymer catechins lowers. From the standpoint of obtaining a tea extract having a concentration of non-polymer catechins of from 0.05 to 0.7 wt. % and has good flavor and taste, the weight ratio is from 12 to 70, more preferably from 15 to 65, more preferably from 20 to 60.

In the invention, extraction is performed to give the extraction percentage of non-polymer catechins, as calculated in accordance with the above-described equation, from 40 to 100%. The extraction percentage less than 40 wt. % is not economical, because a large amount of tea leaves is required to obtain a tea extract containing a high concentration of non-polymer catechins.

Although the extraction time in the process of the invention is determined by the extraction percentage of non-polymer catechins, it is preferably from 2 to 60 minutes, more preferably from 3 to 48 minutes, even more preferably from 4 to 28 minutes in one-path extraction.

In the process of the invention, a tea extract having the concentration of non-polymer catechins of from 0.05 to 0.7 wt. % is obtained. When the concentration of non-polymer catechins is less than 0.05 wt. %, such a tea extract cannot be used for the preparation of a beverage containing catechin at high concentration. When the concentration of non-polymer catechins exceeds 0.7 wt. %, such a tea extract has deteriorated flavor and taste even if it is diluted to low concentration The tea extract thus obtained can be used for the preparation of a packaged tea beverage either as is or after dilution, because it contains non-polymer catechins at a concentration as high as from 0.05 to 0.7 wt. % and has good flavor and taste without coarse taste. When a packaged tea beverage is prepared using the tea extract thus obtained, the concentration of non-polymer catechins is adjusted to from 0.05 to 0.5 wt. %, preferably from 0.092 to 0.4 wt. %, more preferably from 0.11 to 0.3 wt. %, even more preferably from 0.12 to 0.3 wt. %, at which the non-polymer catechins can bring about accumulated fat burning promoting effects, dietary fat burning promoting effects and hepatic β-oxidation gene expression promoting effects (Japanese Patent Application Laid-Open No. 2002-326932).

In the packaged tea beverage according to the invention, the proportion of the gallates consisting of catechin gallate, epicatechin gallate, gallocatechin gallate and epigallocatechin gallate in the entire non-polymer catechins may be preferably from 35 to 100 wt. %, more preferably from 35 to 98 wt. %, even more preferably from 35 to 95 wt. % from the standpoint of the effectiveness of the physiological effects of the non-polymer catechins.

The packaged tea beverage of the invention obtained by filling the tea extract thus prepared including the first to third aspects of the invention.

The packaged tea beverage of the present invention of as is or after dilution preferably contains a bitterness regulator, because it improves the taste of the beverage. Cyclodextrins are preferred as the bitterness regulator. Examples of the cyclodextrins include α-, β- and γ-cyclodextrins as well as branched α-, β- and γ-cyclodextrins. These cyclodextrins can be incorporated in the beverage of the invention preferably at from 0.005 to 0.5 wt. %, more preferably at from 0.01 to 0.3 wt. %.

To the packaged tea beverage according to the present invention, it is possible to further incorporate additives in consideration of the ingredients derived from tea. Examples include antioxidants, spices, various esters, organic acids, organic acid salts, inorganic acids, inorganic acid salts, inorganic salts, colorants, emulsifiers, preservatives, seasoning agents, sweeteners, sour seasonings, gums, oils, vitamins, amino acid, fruit juice extracts, vegetable extracts, nectar extracts, pH regulators and quality stabilizers. They may be added either singly or in combination.

The packaged tea beverage according to the invention has a pH, at 25° C., of from 3 to 7, more preferably from 4 to 7, even more preferably from 5 to 7 from the standpoint of taste (flavor and taste) and stability of catechins.

To bring about accumulated fat burning promoting effect, dietary fat burning promoting effect and hepatic β-oxidation gene expression promoting effect, it is recommended for an adult to take a beverage containing non-polymer catechins in an amount of 300 mg or greater, preferably 450 mg or greater, more preferably 500 mg or greater a day in terms of non-polymer catechins. More specifically, intake of beverages each containing 483 mg, 555 mg or 900 mg of non-polymer catechins results in anti-obesity effect and visceral fat reducing effect (Japanese Patent Application Laid-Open No. 2002-326932).

Accordingly, also the packaged tea beverage of the invention preferably contains, as a daily intake amount per adult, 300 mg or greater, preferably 450 mg or greater, more preferably 500 mg or greater of non-polymer catechins. Such an amount of non-polymer catechins is filled in a container having a capacity of 350 to 500 mL and provided as a packaged tea beverage.

Containers to be used for the packaged tea beverages of the invention include, similar to containers ordinarily used for beverages, molded containers composed mainly of polyethylene terephthalate (so-called PET bottles), metal cans, paper containers combined with metal foils or plastic films, and bottles. The term "packaged beverage" as used herein means a beverage which can be drunken without dilution.

The packaged tea beverage of the invention is prepared under sterilization conditions as prescribed in the Food Sanitation Act, when it can be subjected to heat sterilization after filled in a package such as metal can. For those which cannot be subjected to retort sterilization like PET bottles or paper containers, a process is adopted such that the mixture is sterilized beforehand under similar sterilization conditions as those described above, for example, at a high temperature for a short time by a plate-type heat exchanger or the like, is then chilled to a certain temperature, and is then filled in a container. In a container filled with some ingredients under aseptic conditions, another ingredient may be filled. It is also possible to conduct an operation such that subsequent to heat sterilization under acidic conditions, the pH of the mixture is restored to neutral under aseptic conditions or that subsequent to heat sterilization under neutral conditions, the pH of the mixture is restored to acidic under aseptic conditions.

EXAMPLES

Measurement of Catechins

A packaged beverage, which had been filtrated through a filter (0.8 μm) and then diluted with distilled water, was subjected to a gradient elution using a high-performance liquid chromatograph (model: SCL-10Avp), manufactured by Shimadzu Corporation, fitted with an octadecyl-introduced LC packed column, "L-Column, TM ODS" (4.6 mm in diameter×250 mm; product of Chemicals Evaluation and Research Institute, Japan) at the column temperature of 35° C. A 0.1 mol/L solution of acetic acid in distilled water and a 0.1 mol/L solution of acetic acid in acetonitrile were fed as mobile phase solution A and mobile phase solution B, respectively, at flow rates of 1.0 mL/min. The gradient conditions were set as follows:

| Time | Solution A | Solution B |
|---|---|---|
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |

The measurement was conducted under the conditions of injected sample quantity of 10 μL and UV detector wavelength of 280 nm.

Measurement of Caffeine

The amount of caffeine was determined simultaneously upon measurement of the catechins. The retention time of caffeine was 27.2 minutes.

Measurement of the Content of Water Insoluble Solids Having a Particle Size of from 0.2 to 0.8 μm A liquid (100 g), which had been obtained by diluting a tea extract with deionized water to give a non-polymer catechins concentration of 0.05 wt. % and filtering through a membrane filter having 0.8 μm pore size, was filtrated under suction through an "Omnipore membrane filter" (diameter: 90 mm) having 0.2 μm pore size (manufactured by Millipore Corporation), and based on a difference between an initial dry weight of the filter having 0.2 μm pore size and its dry weight after the filtration and the amount of the diluted extract used for the filtration, the content of water insoluble solids in the diluted extract was calculated. It was then multiplied by a dilution ratio, whereby the content of water insoluble solids in the extract was determined. The constant weight (mg/L) of the filter was determined by drying it at 105° C. for 3 hours and then allowing it to cool down for 1 hour in a desiccator at room temperature.

Extractor

A tea extract was prepared using the extractor as illustrated in FIG. 1. Extracting water sent by a pump 1 was heated in a deionized-water heating heat exchanger 2 and fed to the column upward from the lower part of the column or downward from the upper part of the column. Tea leaves 4 were charged in a space between a tea leaf retainer plate (lower) 6 and a tea leaf retainer plate (upper) 5 in the extraction column. The extract was recovered in an extract recovery tank 8 via an extract cooling heat exchanger 7. Any extractor can be used insofar as it is equipped with a mechanism holding tea leaves in a tea-leaf filling chamber in the column form.

Example 1

Invention Product 1

Green tea leaves (100 g) from Miyazaki were filled in a closed extraction column (inner diameter: 70 mm, height: 137 mm) and deionized water heated to 65° C. was fed upward from the lower part of the column at a rate of 0.50 L/min. Upon this extraction, the height of the tea leaves just after charging was 75 mm, linear speed was 13.0 cm/min and average retention time was 1.1 min. The extract was immediately cooled to 25° C. or less by a heat exchanger. The feeding of the deionized water was stopped when the weight of the extract became 60 times by weight as much as the tea leaves filled in the column. The extract in the tank was mixed uniformly and provided for analysis.

Invention Product 2

Green tea leaves (100 g) from Miyazaki were filled in a closed extraction column (inner diameter: 70 mm, height: 137 mm) and deionized water heated to 85° C. was fed upward from the lower part of the column at a rate of 0.25 L/min. Upon this extraction, the height of the tea leaves just after charging was 75 mm, linear speed was 6.5 cm/min and average retention time was 2.2 min. The extract was immediately cooled to 25° C. or less by a heat exchanger. The feeding of the deionized water was stopped when the weight of the extract became 40 times by weight as much as the tea leaves filled in the column. The extract in the tank was mixed uniformly and provided for analysis.

Invention Product 3

Green tea leaves (100 g) from Miyazaki were filled in a closed extraction column (inner diameter: 70 mm, height: 250 mm) and deionized water heated to 65° C. was fed downward from the upper part of the column at a rate of 0.50 L/min. Upon this extraction, the height of the tea leaves just after filling was 75 mm, linear speed was 13.0 cm/min and average retention time was 3.1 min. The extract was immediately cooled to 25° C. or less by a heat exchanger. The feeding of the deionized water was stopped when the weight of the extract became 30 times by weight as much as the tea leaves filled in the column. The extract in the tank was mixed uniformly and provided for analysis.

Comparative Product 1

After 4320 g of deionized water heated to 65° C. and 144 g of green tea leaves from Miyazaki were charged in a kneader, the mixture was stirred for 5 minutes for extraction. The tea leaves were removed from the extract by using a tea-leaf separating plate, followed by cooling to 25° C. or less by a heat exchanger. The resulting extract was mixed uniformly and provided for analysis.

Comparative Product 2

Green tea leaves (100 g) from Miyazaki were filled in a closed extraction column (inner diameter: 70 mm, height: 137 mm) and deionized water heated to 65° C. was fed upward from the lower part of the column at a rate of 0.25 L/min. Upon this extraction, the height of the tea leaves just after filling was 75 mm, linear speed was 6.5 cm/min and average retention time was 2.2 min. The extract was immediately cooled to 25° C. or less by a heat exchanger. The feeding of the deionized water was stopped when the weight of the extract became 10 times by weight as much as the tea leaves filled in the column. The extract in the tank was mixed uniformly and provided for analysis.

Comparative Product 3

Green tea leaves (100 g) from Miyazaki were filled in a closed extraction column (inner diameter: 70 mm, height: 137 mm) and deionized water heated to 40° C. was fed upward from the lower part of the column at a rate of 0.25 L/min. Upon this extraction, the height of the tea leaves just after filling was 75 mm, linear speed was 6.5 cm/min and average retention time was 2.2 min. The extract was immediately cooled to 25° C. or less by a heat exchanger. The feeding of the deionized water was stopped when the weight of the extract became 117 times by weight as much as the tea leaves filled in the column. The extract in the tank was mixed uniformly and provided for analysis.

Comparative Product 4

Green tea leaves (100 g) from Miyazaki were filled in a closed extraction column (inner diameter: 70 mm, height: 137 mm) and deionized water heated to 95° C. was fed upward from the lower part of the column at a rate of 0.25 L/min. Upon this extraction, the height of the tea leaves just after filling was 75 mm, linear speed was 6.5 cm/min and average retention time was 2.2 min. The extract was immediately cooled to 25° C. or less by a heat exchanger. The feeding of the deionized water was stopped when the weight of the extract became 5 times by weight as much as the tea leaves filled in the column. The extract in the tank was mixed uniformly and provided for analysis.

Extracting conditions, Brix of the extract thus obtained, concentration of non-polymer catechins, caffeine concentration, caffeine/non-polymer catechins ratio and extraction percentage are shown in Table 1 as the results of analysis.

TABLE 1

| | | Extraction Temp. ° C. | Extract/ tea leaves charged | Brix | Conc. of catechins wt. % | Conc. of caffeine wt. % | Caffeine/ catechins | Extraction percentage of catechins % |
|---|---|---|---|---|---|---|---|---|
| Raw material tea leaves | | | | | 11.95 | 2.61 | 0.218 | |
| Invention product | 1 | 65 | 60 | 0.80 | 0.185 | 0.042 | 0.229 | 92.6 |
| | 2 | 85 | 40 | 1.26 | 0.294 | 0.064 | 0.219 | 98.4 |
| | 3 | 65 | 30 | 1.44 | 0.338 | 0.079 | 0.234 | 84.7 |
| Comp. product | 1 | 65 | 30 | 1.04 | 0.242 | 0.063 | 0.259 | 53.8 |
| | 2 | 65 | 10 | 2.01 | 0.465 | 0.118 | 0.254 | 38.9 |
| | 3 | 40 | 117 | 0.34 | 0.077 | 0.019 | 0.244 | 74.2 |
| | 4 | 95 | 5 | 5.02 | 1.170 | 0.316 | 0.270 | 48.8 |

In the tea extracts of Invention Products 1 to 3, the caffeine/non-polymer catechins ratio was 110% or less of that of the raw material tea leaves, suggesting that with regards to this ratio, these tea extracts had a composition almost equal to the natural composition. In the tea extracts of Comparative Products 1 to 4, on the other hand, the caffeine/non-polymer catechins ratio exceeded 110% of that of the raw material tea leaves, suggesting that these tea extracts had a composition different from the natural composition.

Example 2

The tea extracts of Invention Products 1 to 3 obtained in Example 1 were diluted with deionized water if necessary to adjust their concentrations of non-polymer catechins to fall within a range of from 0.05 to 0.338 wt. %, whereby PET-packaged green tea beverages were prepared. The beverages thus obtained had a caffeine/non-polymer catechins ratio almost equal to that of raw material tea leaves and had good flavor and taste.

Example 3

Invention Product 4

Green tea leaves (100 g) from Miyazaki were filled in a closed extraction column (inner diameter: 70 mm, height: 137 mm) and 3000 g of deionized water heated to 65° C. was circulated and fed upward from the lower part of the column for 15 minutes at a rate of 0.50 L/min. Upon this extraction, the height of the tea leaves just after filling was 75 mm, linear speed was 13.0 cm/min and average retention time was 1.1 min. The extract was immediately cooled to 25° C. or less by a heat exchanger. The extract in the tank was mixed uniformly and provided for analysis.

Invention Product 5

Green tea leaves (100 g) from Miyazaki were filled in a closed extraction column (inner diameter: 70 mm, height: 137 mm) and deionized water heated to 85° C. was fed upward from the lower part of the column at a rate of 0.25 L/min. Upon this extraction, the height of the tea leaves just after filling was 75 mm, linear speed was 6.5 cm/min and average retention time was 2.2 min. The extract was immediately cooled to 25° C. or less by a heat exchanger. The feeding of the deionized water was stopped when the weight of the extract became 20 times by weight as much as the tea leaves filled in the column. The extract in the tank was mixed uniformly and provided for analysis.

Invention Product 6

Green tea leaves (100 g) from Miyazaki were filled in a closed extraction column (inner diameter: 70 mm, height: 137 mm) and deionized water heated to 40° C. was fed upward from the lower part of the column at a rate of 0.25 L/min. Upon this extraction, the height of the tea leaves just after filling was 75 mm, linear speed was 6.5 cm/min and average retention time was 2.2 min. The extract was immediately cooled to 25° C. or less by a heat exchanger. The feeding of the deionized water was stopped when the weight of the extract became 80 times by weight as much as the tea leaves filled in the column. The extract in the tank was mixed uniformly and provided for analysis.

Invention Product 7

Green tea leaves (100 g) from Miyazaki were filled in a closed extraction column (inner diameter: 70 mm, height: 250 mm) and deionized water heated to 65° C. was fed downward from the upper part of the column at a rate of 0.2 L/min. Upon this extraction, the height of the tea leaves just after filling was 75 mm, linear speed was 5.2 cm/min and average retention time was 3.8 min. The extract was immediately cooled to 25° C. or less by a heat exchanger. The feeding of the deionized water was stopped when the weight of the extract became 50 times by weight as much as the tea leaves filled in the column. The extract in the tank was mixed uniformly and provided for analysis.

Comparative Product 5

Green tea leaves (50 g) from Shizuoka were filled in a closed extraction column (inner diameter: 70 mm, height: 137 mm) and 2500 g of deionized water heated to 65° C. was circulated and fed downward from the upper part of the column for 15 minutes at a rate of 0.50 L/min. Upon this extraction, the height of the tea leaves just after filling was 35 mm, linear speed was 13.0 cm/min and average retention time was 0.8 min. The contents in the column were stirred with an inclined paddle blade at a rate of 20 r/min. The extract was then cooled to 25° C. or less by a heat exchanger. The resulting extract in the tank was mixed uniformly and provided for analysis.

Comparative Product 6

In a kneader were charged 4320 g of deionized water heated to 65° C. and 144 g of green tea leaves from Miyazaki, followed by stirring and extraction for 5 minutes. The tea leaves were removed from the extract by using a tea-leaf separating plate and the resulting extract was cooled to 25° C. or less by a heat exchanger. The cooled extract was mixed uniformly and provided for analysis.

The tea extracts thus obtained were each diluted with deionized water so that the concentration of non-polymer catechins became 0.05%. The tea extract thus diluted was evaluated for its flavor and taste by a panel of four experts.

(Evaluation Criteria)

A: having excellent flavor and taste without coarse taste.
B: having good flavor and taste with less coarse taste.
C: having a little poor flavor and taste with coarse taste.

Extracting conditions, Brix of the extract thus obtained, concentration of non-polymer catechins, amount of water-insoluble solids having a particle size of from 0.2 to 0.8 μm, and evaluation results of flavor and taste are shown in Table 2.

TABLE 2

|  |  | Temp. ° C. | Extract/tea leaves charged | Feeding method | Brix | Conc. of non-polymer catechins Wt. % | Content of 0.2 to 0.8 μm water insoluble solids | (B)/(A) (mg/L)/ (mg/L) | Flavor and taste |
|---|---|---|---|---|---|---|---|---|---|
| Invention product | 4 | 65 | 30 | Upward flow, reflux flow | 1.15 | 0.268 | 89.4 | 0.033 | A |
|  | 5 | 85 | 20 | Upward flow, 1 path | 1.70 | 0.441 | 220.7 | 0.050 | A |
|  | 6 | 40 | 80 | Upward flow, 1 path | 0.45 | 0.100 | 22.0 | 0.022 | A |
|  | 7 | 65 | 50 | Downward flow, 1 path | 0.88 | 0.201 | 78.4 | 0.039 | A |
| Comp. product | 5 | 65 | 50 | Downward flow, stirring, circulation | 0.78 | 0.178 | 176.2 | 0.099 | C |
|  | 6 | 65 | 30 | Kneader | 1.00 | 0.232 | 234.3 | 0.101 | C |

In any one of the tea extracts obtained as Invention Products 4 to 7, a ratio of (B) the content of water insoluble solids having a particle size of from 0.2 to 0.8 μm to (A) the concentration of non-polymer catechins, that is, [(B)/(A)] is 0.09 or less. These tea extracts were refreshing without coarse taste and had good flavor and taste. The tea extracts obtained as Comparative Products 5 to 6, on the other hand, had a coarse taste and had a little inferior flavor and taste.

Example 4

Invention Product 8

Green tea leaves (100 g) from Miyazaki were filled in a closed extraction column (inner diameter: 70 mm, height: 137 mm) and deionized water heated to 85° C. was fed upward from the lower part of the column at a rate of 0.25 L/min. The extract was immediately cooled to 25° C. or less by a heat exchanger. The feeding of the deionized water was stopped when the weight of the extract became 70 times by weight as much as the tea leaves filled in the column. The extract in the tank was mixed uniformly and provided for analysis.

Invention Product 9

Green tea leaves (100 g) from Miyazaki were filled in a closed extraction column (inner diameter: 70 mm, height: 137 mm) and deionized water heated to 65° C. was fed upward from the lower part of the column at a rate of 0.25 L/min. The extract was immediately cooled to 25° C. or less by a heat exchanger. The feeding of the deionized water was stopped when the weight of the extract became 60 times by weight as much as the tea leaves filled in the column. The extract in the tank was mixed uniformly and provided for analysis.

Invention Product 10

Green tea leaves (100 g) from Miyazaki were filled in a column similar to that used for the preparation of Invention Product 8 and deionized water heated to 85° C. was fed upward from the lower part of the column at a rate of 0.25 L/min. The extract was immediately cooled to 25° C. or less by a heat exchanger. The feeding of the deionized water was stopped when the weight of the extract became 15 times by weight as much as the tea leaves filled in the column. The extract in the tank was mixed uniformly and provided for analysis.

Invention Product 11

Green tea leaves (100 g) from Miyazaki were filled in a column similar to that used for the preparation of Invention Product 8 and deionized water heated to 65° C. was fed upward from the lower part of the column at a rate of 0.25 L/min. The extract was immediately cooled to 25° C. or less by a heat exchanger. The feeding of the deionized water was stopped when the weight of the extract became 20 times by weight as much as the tea leaves filled in the column. The extract in the tank was mixed uniformly and provided for analysis.

Comparative Product 7

Green tea leaves (100 g) from Miyazaki were filled in a column similar to that used for the preparation of Invention Product 8 and deionized water heated to 95° C. was fed upward from the lower part of the column at a rate of 0.25 L/min. The extract was immediately cooled to 25° C. or less by a heat exchanger. The feeding of the deionized water was stopped when the weight of the extract became 10 times by weight as much as the tea leaves filled in the column. The extract in the tank was mixed uniformly and provided for analysis.

Comparative Product 8

In a kneader were charged 4320 g of deionized water heated to 65° C. and 144 g of green tea leaves from Miyazaki. The mixture was stirred for 5 minutes for extraction. The tea leaves were removed from the extract by using a tea-leaf separating plate. The extract was cooled to 25° C. or less by a heat exchanger, and 3845 g of the extract thus obtained was mixed uniformly and provided for analysis.

The tea extracts thus obtained were evaluated for their flavor and taste by a panel of 4 experts.

(Evaluation Criteria)

A: having excellent flavor and taste without a coarse taste.
B: having good flavor and taste without a coarse taste.
C: having a little poor flavor and taste with a coarse taste.
D: lacking in freshness and having poor flavor and taste Extracting conditions, concentration of non-polymer catechins in the extract thus obtained, extraction percentage and evaluation results of flavor and taste are shown in Table 3.

TABLE 3

|  |  | Temp. ° C. | Extract/tea leaves charged | Treating time Min. | Conc. of non-polymer catechins wt. % | Extraction percentage of catechins % | Flavor & taste |
|---|---|---|---|---|---|---|---|
| Invention product | 8 | 85 | 70 | 28 | 0.171 | 100 | B |
|  | 9 | 65 | 60 | 24 | 0.168 | 84.4 | A |
|  | 10 | 85 | 15 | 6 | 0.533 | 66.9 | A |
|  | 11 | 65 | 20 | 8 | 0.348 | 58.2 | A |
| Comp. product | 7 | 95 | 10 | 4 | 0.784 | 65.6 | D |
|  | 8 | 65 | 30 | 5 | 0.175 | 39.1 | C |

The tea extracts obtained as Invention Products 8 to 11 had a high catechin concentration, high extraction percentage, less coarse taste and good flavor and taste. The tea extract obtained as Comparative Product 7 lacked freshness and had poor flavor and taste. The tea extract obtained as Comparative Product 8 exhibited a low catechin extraction percentage, and had relatively poor flavor and taste with a coarse taste.

Example 5

As shown in Table 4, an extraction efficiency was investigated at predetermined extraction temperature and flow rate only by changing the volume of tea leaves filled in the column. The tea extracts thus obtained were evaluated as in Example 4. The results are shown in Table 4.

Invention Product 12

Green tea leaves (100 g) from Miyazaki were filled in a closed extraction column (inner diameter: 70 mm, height: 100 mm) and deionized water heated to 65° C. was fed upward from the lower part of the column at a rate of 0.25 L/min. The extract was immediately cooled to 25° C. or less by a heat exchanger. The feeding of the deionized water was stopped when the weight of the extract became 30 times by weight as much as the tea leaves filled in the column. The extract in the tank was mixed uniformly and provided for analysis.

Invention Product 13

Green tea leaves (100 g) from Miyazaki were filled in a closed extraction column (inner diameter: 70 mm, height: 137 mm) and deionized water heated to 65° C. was fed upward from the lower part of the column at a rate of 0.25 L/min. The extract was immediately cooled to 25° C. or less by a heat exchanger. The feeding of the deionized water was stopped when the weight of the extract became 30 times by weight as much as the tea leaves filled in the column. The extract in the tank was mixed uniformly and provided for analysis.

Invention Product 14

Green tea leaves (100 g) from Miyazaki were filled in a closed extraction column (inner diameter: 70 mm, height: 192 mm) and deionized water heated to 65° C. was fed upward from the lower part of the column at a rate of 0.25 L/min. The extract was immediately cooled to 25° C. or less by a heat exchanger. The feeding of the deionized water was stopped when the weight of the extract became 30 times by weight as much as the tea leaves filled in the column. The extract in the tank was mixed uniformly and provided for analysis.

Invention Product 15

Green tea leaves (100 g) from Miyazaki were filled in a closed extraction column (inner diameter: 70 mm, height: 274 mm) and deionized water heated to 65° C. was fed upward from the lower part of the column at a rate of 0.25 L/min. The extract was immediately cooled to 25° C. or less by a heat exchanger. The feeding of the deionized water was stopped when the weight of the extract became 30 times by weight as much as the tea leaves filled in the column. The extract in the tank was mixed uniformly and provided for analysis.

Comparative Product 9

Green tea leaves (32 g) from Miyazaki were filled in a closed extraction column (inner diameter: 70 mm, height: 192 mm) and deionized water heated to 65° C. was fed upward from the lower part of the column at a rate of 0.25 L/min. The extract was immediately cooled to 25° C. or less by a heat exchanger. The feeding of the deionized water was stopped when the weight of the extract became 30 times by weight as much as the tea leaves filled in the column. The extract in the tank was mixed uniformly and provided for analysis.

When a (volume in the column)/(volume of the tea leaves just after charging) ratio ranges from 1.0 to 3.6, especially from 1.0 to 2.6 as that in Invention Products 12 to 15, tea extracts showed a high extraction efficiency of non-polymer catechins and had good flavor and taste.

The tea extracts obtained as Invention Products 8 to 11 Example 4 and Invention Products 12 to 15 were diluted if necessary, whereby tea beverages packaged in a PET bottle having a non-polymer catechin concentration of form 0.05 to 0.5 wt. % were obtained. The beverages thus obtained were each a tea beverage excellent in green-tea-flavored taste.

The invention claimed is:

1. A process for preparing a tea extract, which comprises charging tea leaves in a column-type extractor, discharging the extract while continuously feeding the extractor with hot water of from 45 to 95° C., and adjusting an extraction percentage of non-polymer catechins from the tea leaves to from 75 to 100%
    wherein a linear speed of water in said column is from 1.0 to 20.0 cm/min.

2. The process of claim 1, wherein a caffeine/non-polymer catechins ratio in the tea extract ranges from 100 to 110% of a caffeine/non-polymer catechins ratio in the raw material tea leaves.

3. The process of claim 1 or 2, wherein the tea leaves are green tea leaves.

4. The process for preparing a tea extract having the following components (A) and (B):
    (A) from 0.05 to 0.7 wt. % of non-polymer catechins
    (B) water insoluble solids having a particle size of from 0.2 to 0.8 μm, at a content ratio of Component (B) to Component (A) [(B)/(A)] not greater than 0.09, which comprises charging tea leaves in a column-type extractor and performing extraction by discharging the extract from the extractor while continuously feeding cold or hot water thereto
    wherein a linear speed if water in said column is from 1.0 to 20.0 cm/min.

5. The process of claim 4, wherein the tea leaves are green tea leaves.

6. The process for preparing a tea extract having a concentration of non-polymer catechins of from 0.05 to 0.7 wt. %, which comprises filling the column of a closed column extractor with tea leaves at a (volume in the column)/(volume of tea leaves just after charging) ratio ranging from 1.0 to 7.0, feeding cold or hot water upward from the lower part of the column, and adjusting an extraction percentage of non-polymer catechins to 40 to 100%
    wherein a weight ratio of extract to charged tea leaves is from 12 to 70.

7. The process of claim 6, wherein the tea leaves are green tea leaves.

TABLE 4

| | | Temp. °C. | Flow rate L/min | Volume in the column/volume of tea leaves just after charging | Extract/tea leaves charged in the column | Conc. of non-polymer catechins wt. % | Extraction percentage of catechins % | Flavor & taste |
|---|---|---|---|---|---|---|---|---|
| Invention product | 12 | 65 | 0.25 | 1.27 | 30 | 0.307 | 77.1 | A |
| | 13 | 65 | 0.25 | 1.71 | 30 | 0.300 | 75.3 | A |
| | 14 | 65 | 0.25 | 2.40 | 30 | 0.260 | 65.3 | A |
| | 15 | 65 | 0.25 | 3.43 | 30 | 0.208 | 52.2 | A |
| Comp. Product | 9 | 65 | 0.25 | 7.50 | 30 | 0.176 | 39.3 | C |

8. The process of claim 1, wherein said column type extractor is a closed extraction column.

9. The process of claim 1, wherein said hot water has a temperature of from 60 to 80° C.

10. The process of claim 1, wherein an average retention time of a tea leaves layer in water is from 0.5 to 15.0 min.

11. The process of claim 1, wherein a height of tea leaves charged in said column before beginning of said extraction is from 30 to 500 mm.

12. The process of claim 4, wherein said cold or hot water has a temperature of from 0 to 95 C.

13. The process of claim 4, wherein an average retention time of a tea leaves layer in water is from 0.5 to 15.0 min.

14. The process of claim 4, wherein said water insoluble solids are comprised of at least one of polysaccharides, proteins and saponin.

15. The process of claim 6, wherein a ratio of a volume of the column to a volume of said tea leaves just after charging is from 1.0 to 7.0.

16. The process of claim 6, wherein said cold or hot water has a temperature of from 0 to 95 C.

17. The process of claim 6, wherein said cold or hot water further comprises an organic acid or a salt thereof.

* * * * *